US008667477B2

(12) United States Patent
Bentzien et al.

(10) Patent No.: US 8,667,477 B2
(45) Date of Patent: Mar. 4, 2014

(54) MODIFYING SOFTWARE CODE

(75) Inventors: Levke Bentzien, Heidelberg (DE);
Heiko Konrad, Hockenheim (DE);
Tamara Weckwerth, Wiesloch (DE)

(73) Assignee: SAP AG, Walldorf (DE)

( * ) Notice: Subject to any disclaimer, the term of this patent is extended or adjusted under 35 U.S.C. 154(b) by 147 days.

(21) Appl. No.: 13/213,606

(22) Filed: Aug. 19, 2011

(65) Prior Publication Data

US 2012/0174087 A1    Jul. 5, 2012

Related U.S. Application Data

(60) Provisional application No. 61/460,759, filed on Dec. 30, 2010.

(51) Int. Cl.
*G06F 9/44*    (2006.01)

(52) U.S. Cl.
USPC ........... 717/169; 717/171; 717/172; 717/120; 717/122

(58) Field of Classification Search
USPC ........................................................ 717/169
See application file for complete search history.

(56) References Cited

U.S. PATENT DOCUMENTS

| 5,870,745 | A * | 2/1999 | McCune ................................. 1/1 |
| 7,058,582 | B2 * | 6/2006 | Powell ............................. 705/1.1 |
| 7,761,851 | B2 * | 7/2010 | Bailey et al. ..................... 717/121 |
| 7,937,685 | B2 * | 5/2011 | Weil et al. ....................... 717/103 |
| 2004/0158811 | A1 * | 8/2004 | Guthrie et al. .................. 717/103 |
| 2008/0134298 | A1 * | 6/2008 | Nathan et al. ........................ 726/4 |
| 2009/0276752 | A1 * | 11/2009 | Sharma .......................... 717/103 |
| 2010/0057514 | A1 * | 3/2010 | Chee et al. ........................... 705/8 |

OTHER PUBLICATIONS

Application Programming Interface, last retrieved from http://en.wikipedia.org/wiki/API on Feb. 28, 2013.*

* cited by examiner

*Primary Examiner* — Anna Deng
*Assistant Examiner* — Andrew M Lyons
(74) *Attorney, Agent, or Firm* — Fish & Richardson P.C.

(57) ABSTRACT

A computer-implemented method for modifying software code includes: processing a command to modify a first module of software code stored on a production system in a distributed computing environment, where the software code includes a first plurality of data objects and a first plurality of notes; generating at least one queue comprising the second plurality of notes; modifying a second module of software code stored on a development system in the distributed computing environment with the second plurality of notes, where the second module of software code comprising a version of the first module of software code; and transferring the second module of software code to the production system to modify the first module of software code such that the first plurality of notes are modified by the second plurality of notes.

24 Claims, 4 Drawing Sheets

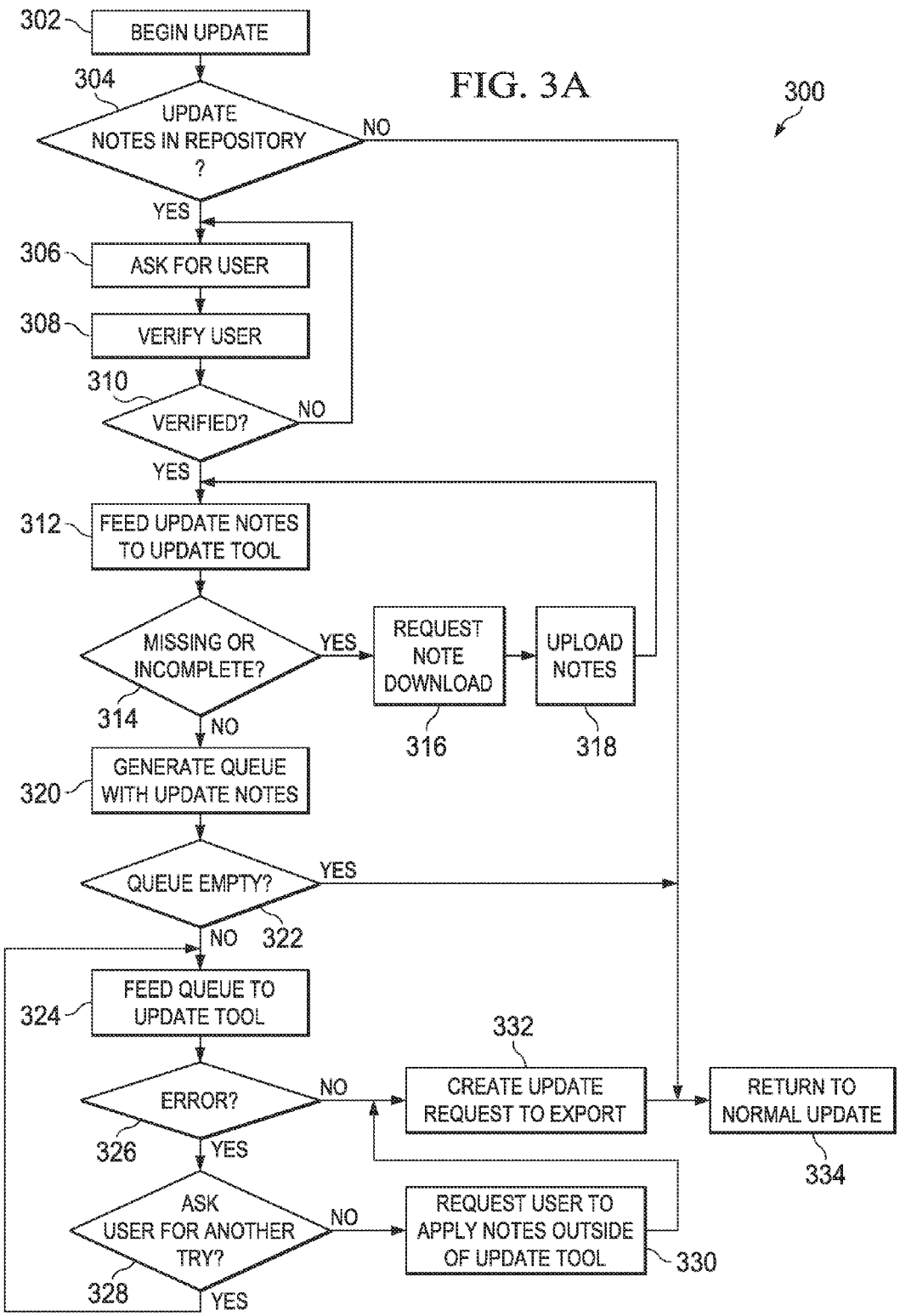

MODIFYING SOFTWARE CODE

CLAIM OF PRIORITY

This application claims priority under 35 U.S.C. §119 to U.S. Provisional Patent Application Ser. No. 61/460,759, filed on Dec. 30, 2010, and entitled "Modifying Software Code," the entire contents of which are incorporated by reference as if fully set forth herein.

TECHNICAL BACKGROUND

This disclosure relates to upgrading software systems and, more particularly, to automatically upgrading software systems with varying versions of software present on the upgraded systems.

BACKGROUND

Software applications often require extensive maintenance throughout the lifecycle of the application. Changes, however, to the application by a customer or developer outside of the original code developed by the software manufacturer may complicate the maintenance efforts. To support the maintenance effort while also staying current with changes made by the customer or developer, specially designed tools may be used to ensure that the latest updates or upgrades to the software application may be made without disturbing the customer's customizations. This may be especially true for enterprise software, where customers are expected to customize the application to reflect its own business processes by, for example, creating their own application settings.

Further complicating matters is the desirability for maintaining a secure, business-critical productive environment in which the software application executes. For example, security concerns may warrant first applying any updates or upgrades to the software application outside of the productive environment. The changes may then be tested to ensure compatibility and workability before being made to the productive environment.

Another concern is that updates and upgrades to the software application may be preferably performed during downtimes rather than mission-critical time periods of application use by the customer. System downtime during an update or upgrade may need to be predictable. Any unexpected interruption of the procedure can ruin the downtime management of the customer. In addition, system inconsistencies caused by errors in the delivery of the update or upgrade should be prevented proactively.

SUMMARY

In one general embodiment, a computer-implemented method for modifying software code includes the following steps performed by one or more processors: processing a command to modify a first module of software code stored on a production system in a distributed computing environment, where the software code includes a first plurality of data objects and a first plurality of notes; generating at least one queue comprising a second plurality of notes; modifying a second module of software code stored on a development system in the distributed computing environment with the second plurality of notes, where the second module of software code comprising a version of the first module of software code; and transferring the second module of software code to the production system to modify the first module of software code such that the first plurality of notes are modified by the second plurality of notes.

One or more specific aspects of this general embodiment may further include: transmitting a request for a development user to an administrator of the development system; receiving the requested development user; and verifying the received development user.

One or more specific aspects of this general embodiment may further include: generating a control file comprising the second plurality of notes; verifying the control file to determine whether the second plurality of notes is incomplete; and delivering the verified control file to the development system to generate the at least one queue.

One or more specific aspects of this general embodiment may further include: verifying the at least one queue comprising the second plurality of notes; based on the verification, creating an update request comprising the at least one queue; and exporting the update request to the development system.

One or more specific aspects of this general embodiment may further include: asking for an update request; receiving the update request; and verifying the update request.

In one or more specific aspects of this general embodiment, modifying a second module of software code stored on a development system in the distributed computing environment with the second plurality of notes may include modifying the second module of software code stored on a source repository of the development system.

One or more specific aspects of this general embodiment may further include: modifying a third module of software code stored on a shadow repository in the distributed computing environment with the second plurality of notes, the second module of software code comprising a version of the first module of software code.

In one or more specific aspects of this general embodiment, generating at least one queue including the second plurality of notes may include exposing an API.

The present disclosure also provides a computer-readable, non-transitory storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes at least a server including one or more processors, and a computer-readable storage medium coupled to the one or more processors having instructions stored thereon which, when executed by the one or more processors, cause the one or more processors to perform operations in accordance with implementations of the methods provided herein.

Various embodiments of and including an application update tool may include one or more of the following features or advantages. For example, the update tool may facilitate the application of an update or upgrade to a particular software system automatically. The update tool may also facilitate the automatic application of the update or upgrade to a particular repository among several repositories of the software system, such as a target repository. The update tool may thus minimize if not substantially prevent inconsistencies in the software application through error corrections, thereby minimizing stopped processes in a productive environment of the software system. The update tool may also facilitate performance improvements without extending the downtime by manual interaction from the administrator. As yet another example, the update tool may enable the update or upgrade to react correctly to the repository level present at the customer system in different phases of the procedure. Further, the update tool may verify the update or upgrade through a registration process prior to it being added to an update or upgrade procedure.

These general and specific aspects may be implemented using a device, system or method, or any combinations of devices, systems, or methods. Put differently, while generally described as computer implemented software that provides for test seams of software code to be tested, some or all of the aspects may be computer implemented methods or further included in respective systems or other devices for performing this described functionality. The details of one or more implementations are set forth in the accompanying drawings and the description below. Other features, objects, and advantages will be apparent from the description and drawings, and from the claims.

DESCRIPTION OF DRAWINGS

FIGS. 3A-3B illustrate example methods for updating and/or upgrading an enterprise software application by an update tool according to the present disclosure.

DETAILED DESCRIPTION

Figure 1:
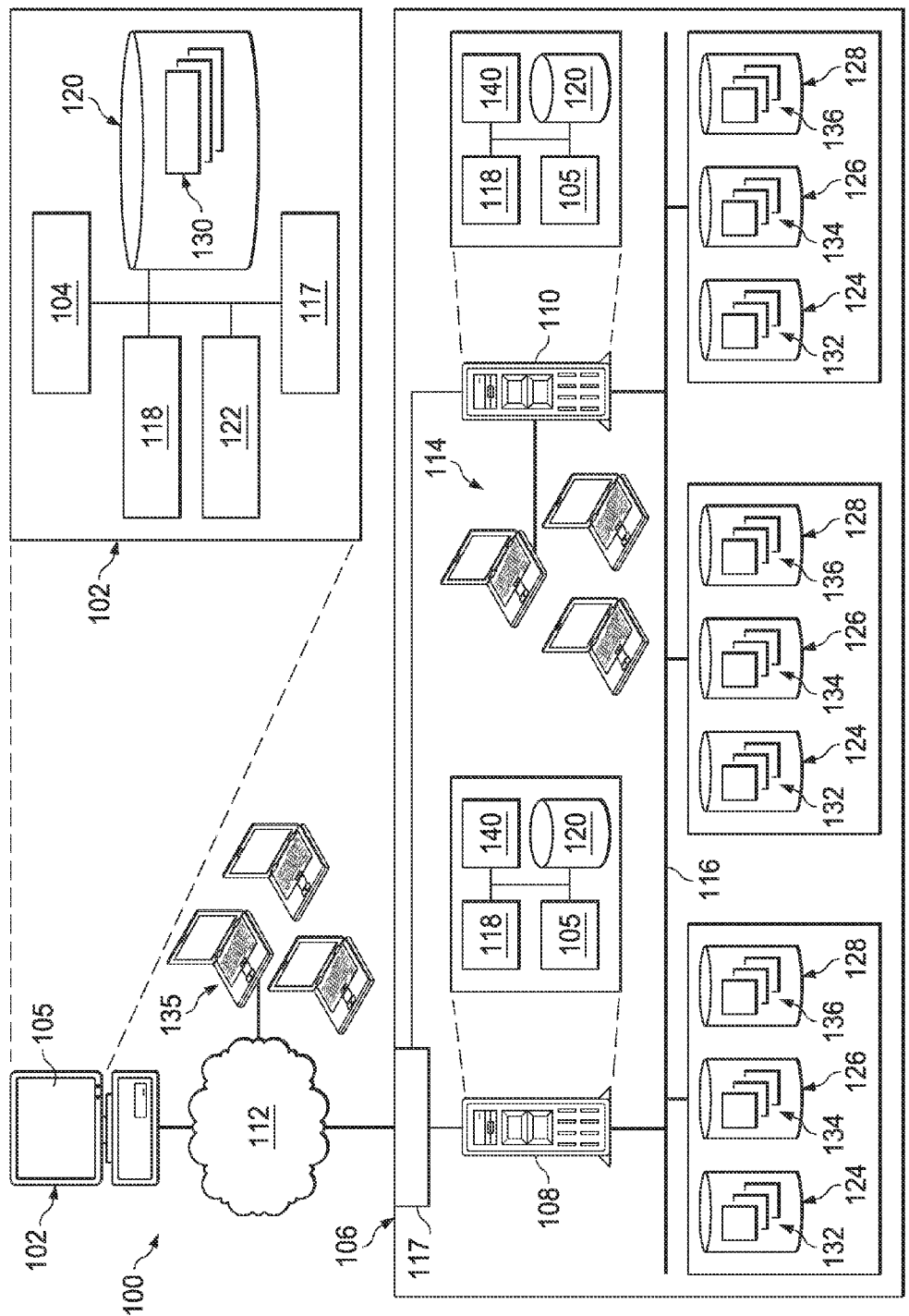
FIG. 1 illustrates one embodiment of a distributed computing system including a business enterprise system executing an enterprise software application according to the present disclosure.

FIG. 1 illustrates an example distributed computing system 100 for updating and/or upgrading an enterprise software application. For example, the distributed computing system 100 may facilitate an update of an existing enterprise software application through bug fixes, minor corrections, minor version update, or otherwise, while the distributed computing system 100 may facilitate an upgrade of an enterprise software application through a new version release. In some implementations, the distributed computing system 100 may facilitate the update and/or upgrade of the enterprise software application by updating and/or upgrading the application with corrections (e.g., program corrections, notes, methods for table/field additions, deletions/corrections, customization changes, code correction, information such as FAQs, and otherwise).

The illustrated distributed computing system 100 includes or is communicably coupled with server 102 and one or more enterprise systems, such as the illustrated enterprise system 106, at least some of which communicate across network 112. In general, distributed computing system 100 depicts an example configuration of a system capable of updating and/or upgrading an enterprise software system with an update tool 104. The distributed computing system 100 also supports one or more servers 102 (e.g., servers located at, or controlled by or under the direction of a software provider or software servicer) operable to provide a set of services to the enterprise system 106 in which the one or more servers can be logically grouped and accessible within a cloud computing network. Accordingly, a unified runtime framework and graphical, process-centric user interface may be provided to an enterprise system 106 or server 102 as an on-demand solution through the cloud computing network or as a traditional server-client system.

The enterprise system 106, at a high level, includes a development system 108 and a productive system 110 communicably coupled to the network 112 (and thus the server 102 and other servers and, possibly, other enterprise systems) through an interface 117. In some embodiments, the enterprise system 106 may include additional systems besides the development system 108 and the productive system 110, such as, for example, a quality assurance system (not shown here). Moreover, in some embodiments, the development system 108 may include all or a portion of such a quality assurance system, which, in some aspects, may perform and/or facilitate quality assurance testing on any changes to software on or associated with the enterprise system 106. For instance, changes (e.g., updates and/or upgrades) to enterprise or business applications on the enterprise system 106, such as enterprise application 140, may first be made in the development system 108 and then transferred or copied to the quality assurance system for testing prior to being introduced in the productive system. As described in more detail below, the enterprise system 106 also includes a source repository 124, a shadow repository 126, and a target repository 128 communicably coupled to each development system 108 and productive system 110 through a transport service 116. More specifically, each development system 108 and/or productive system 110 within the enterprise system 106 may have access to a unique set of repositories 124, 126, and 128. Thus, for each system 108 and/or 110, the repositories may be changed in setup over time starting, for example, with a source repository, then a shadow repository that exists in parallel, and ending with a target repository.

The server 102, generally, is any server that stores one or more hosted applications 122, where at least a portion of the hosted applications 122 are executed via requests and responses sent to users or clients within and communicably coupled to the illustrated distributed computing system 100 of FIG. 1. For example, server 102 may be a Java 2 Platform, Enterprise Edition (J2EE)-compliant application server that includes Java technologies such as Enterprise JavaBeans (EJB), J2EE Connector Architecture (JCA), Java Messaging Service (JMS), Java Naming and Directory Interface (JNDI), and Java Database Connectivity (JDBC). In some instances, the server 102 may store a plurality of various hosted applications 122, while in other instances, the server 102 may be a dedicated server meant to store and execute only a single hosted application 122 or other applications. In some instances, the server 102 may comprise a web server or be communicably coupled with a web server, where the hosted applications 122 represent one or more web-based applications accessed and executed via network 112 by the enterprise system 106 to perform the programmed tasks or operations of the hosted application 122.

At a high level, the server 102 comprises an electronic computing device operable to receive, transmit, process, store, or manage data and information associated with the distributed computing system 100. The server 102 illustrated in FIG. 1 can be responsible for receiving application requests from one or more software applications on or associated with the enterprise system 106, such as an enterprise application 140 or other or business applications associated with additional enterprise systems of distributed computing system 100, and responding to the received requests by processing said requests in the associated hosted application 122, and sending the appropriate response from the hosted application 122 back to the requesting enterprise application 140. Alternatively, the hosted application 122 at server 102 can be capable of processing and responding to local requests from a user accessing server 102 locally. Accordingly, in addition to requests from the enterprise system 106 illustrated in FIG. 1, requests associated with the hosted applications 122 may also be sent from internal users, external or third-party customers, other automated applications, as well as any other appropriate entities, individuals, systems, or computers. Further, the terms "enterprise application" and "business application" may be used interchangeably as appropriate without departing from the scope of this disclosure.

As used in the present disclosure, the term "computer" is intended to encompass any suitable processing device. For example, although FIG. 1 illustrates a single server 102, distributed computing system 100 can be implemented using two or more servers 102, as well as computers other than servers, including a server pool. Indeed, server 102 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated server 102 may be adapted to execute any operating system, including Linux, UNIX, Windows, Mac OS, or any other suitable operating system. According to one embodiment, server 102 may also include or be communicably coupled with a mail server.

The interface 117 is used by the server 102 for communicating with other systems in a client-server or other distributed environment (including within distributed computing system 100) connected to the network 112 (e.g., enterprise system 106, as well as other systems communicably coupled to the network 112). Although FIG. 1 depicts a server-client environment, other implementations of the runtime environment for testing one or more CUT modules utilizing the test framework 104 and one or more test seams. For example, the runtime environment may be provided or accessed locally at a computer. Generally, the interface 117 comprises logic encoded in software and/or hardware in a suitable combination and operable to communicate with the network 112. More specifically, the interface 117 may comprise software supporting one or more communication protocols associated with communications such that the network 112 or interface's hardware is operable to communicate physical signals within and outside of the illustrated distributed computing system 100.

Generally, example server 102 may be communicably coupled with a network 112 that facilitates wireless or wireline communications between the components of the distributed computing system 100 (i.e., between the server 102 and enterprise system 106 as well as other enterprise systems), as well as with any other local or remote computer, such as additional clients, servers, or other devices communicably coupled to network 112 but not illustrated in FIG. 1. In the illustrated environment, the network 112 is depicted as a single network in FIG. 1, but may be comprised of more than one network without departing from the scope of this disclosure, so long as at least a portion of the network 112 may facilitate communications between senders and recipients. The network 112 may be all or a portion of an enterprise or secured network, while in another instance at least a portion of the network 112 may represent a connection to the Internet. In some instances, a portion of the network 112 may be a virtual private network (VPN), such as, for example, the connection between the enterprise system 106 and the server 102. Further, all or a portion of the network 112 can comprise either a wireline or wireless link. Example wireless links may include 802.11a/b/g/n, 802.20, WiMax, and/or any other appropriate wireless link. In other words, the network 112 encompasses any internal or external network, networks, sub-network, or combination thereof operable to facilitate communications between various computing components inside and outside the illustrated distributed computing system 100. The network 112 may communicate, for example, Internet Protocol (IP) packets, Frame Relay frames, Asynchronous Transfer Mode (ATM) cells, voice, video, data, and other suitable information between network addresses. The network 112 may also include one or more local area networks (LANs), radio access networks (RANs), metropolitan area networks (MANs), wide area networks (WANs), all or a portion of the Internet, and/or any other communication system or systems at one or more locations. The network 112, however, is not a required component of the present disclosure.

In the illustrated implementation, and as shown in FIG. 1, each of the server 102, the development system 108, and the productive system 110 include or are communicably coupled with a processor 118, a memory 120, and a Graphical User Interface (GUI) 105.

Each of the GUIs 105 comprise a graphical user interface operable to, for example, allow the user of the server 102 (or development system 108 or productive system 110) to interface with at least a portion of the platform for any suitable purpose, such as creating, preparing, requesting, or analyzing data, as well as viewing and accessing source documents associated with business transactions. Generally, the GUI 105 provides the particular user with an efficient and user-friendly presentation of business data provided by or communicated within the system. The GUI 105 may comprise a plurality of customizable frames or views having interactive fields, pull-down lists, buttons, and other controls operated by the user. For example, GUI 105 may provide interactive elements that allow a user to enter or select elements of business process instances in GUI 105. More generally, GUI 105 may also provide general interactive elements that allow a user to access and utilize various services and functions of hosted applications 122. The GUI 105 is often configurable, supports a combination of tables and graphs (bar, line, pie, status dials, etc.), and is able to build real-time portals, where tabs are delineated by key characteristics (e.g., site or micro-site). Therefore, the GUI 105 contemplates any suitable graphical user interface, such as a combination of a generic web browser, intelligent engine, and command line interface (CLI) that processes information in the platform and efficiently presents the results to the user visually.

Although illustrated as a single processor 118 in certain components shown in FIG. 1, two or more processors may be used according to particular needs, desires, or particular embodiments of distributed computing system 100. Each processor 118 may be a central processing unit (CPU), a blade, an application specific integrated circuit (ASIC), a field programmable gate array (FPGA), or another suitable component. Generally, the processor 118 in the server 102 executes instructions and manipulates data to perform the operations of server 102 and, specifically, the one or more plurality of operations of the hosted application 122 and the update tool 104. Specifically, the server's processor 118 executes the functionality required to receive and respond to requests from the enterprise system 106 and its respective business applications, such as business application 140, as well as the functionality required to perform the other operations of the hosted application 122. The processors 118 in the development system 108 and the productive system 110 execute instructions and manipulate data to perform the operations of the respective systems and, specifically, the one or more plurality of operations of the enterprise application 140, as well as any other software.

Regardless of the particular implementation, "software" may include computer readable instructions, firmware, wired or programmed hardware, or any combination thereof on a non-transitory, tangible medium operable when executed to perform at least the processes and operations described herein. Indeed, each software component may be fully or partially written or described in any appropriate computer language including C, C++, Java, Visual Basic, Assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate.

At a high level, each of the one or more hosted applications 122, enterprise application 140, and/or update tool 104 is any application, program, module, process, or other software that may execute, change, delete, generate, or otherwise manage information according to the present disclosure. In certain cases, only one hosted application 122 may be located at a particular server 102. In others, a plurality of related and/or unrelated hosted applications 122 may be stored at a single server 102, or located across a plurality of other servers 102, as well. In certain cases, distributed computing system 100 may implement a composite hosted application 122. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, the hosted application 122 and/or enterprise application 140 may represent web-based applications accessed and executed by the enterprise system 106 via the network 112 (e.g., through the Internet). Further, while illustrated as internal to server 102 and the enterprise system 106, respectively, one or more processes associated with a particular hosted application 122 and/or enterprise application 140 may be stored, referenced, or executed remotely. For example, a portion of a particular hosted application 122 and/or enterprise application 140 may be a web service associated with the application that is remotely called, while another portion of the hosted application 122 and/or enterprise application 140 may be an interface object or agent bundled for processing at a remote enterprise system 106. Moreover, any or all of the hosted applications 122 and/or enterprise application 140 may be a child or sub-module of another software module without departing from the scope of this disclosure. Still further, portions of the hosted application 122 and/or enterprise application 140 may be executed by a user working directly at server 102, as well as remotely at enterprise system 106.

As illustrated, processor 118 can also execute the update tool 104. As explained more fully below, the update tool 104, in some embodiments, may implement a systematic procedure to automatically apply one or more corrections to an upgrade and/or update to the enterprise software 140, thereby preventing inconsistencies and stopped processes and providing performance improvements without extending downtime of the enterprise application 140. For example, the update tool 104 may automatically apply corrections in form of notes without requiring manual interaction from an administrator of the enterprise system 106 to take account of customizations or changes made to the enterprise application 140 after the original delivery of the application 140 from the software provider. In some embodiments, as explained more fully below, the update tool 104 may execute multiple repository levels (e.g. three levels) to reach a target release of the enterprise application 140. For instance, one repository level may be a present enterprise system repository—also called source repository. Secondly, there may be a shadow repository, such as a fixed repository (e.g., a DVD or other tangible media) in case of an application update or a clone repository based on the source repository in the case of a new version of the enterprise application 140 (i.e., upgrade). There may also be a target repository, which results from adding extensions and corrections to the shadow repository.

In general, each component of the distributed computing system 100 (e.g., the server 102, the development system 108, and the productive system 110) includes memory 120 for storing data and program instructions. Memory 120 may include any memory or database module and may take the form of volatile or non-volatile memory including, without limitation, magnetic media, optical media, random access memory (RAM), read-only memory (ROM), removable media, or any other suitable local or remote memory component. Memory 120 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the server 102 and its one or more hosted applications 122, as well as the development system 108 and productive system 110 and the enterprise application 140.

Memory 120 may also store data objects, for example, all or portions of the update corrections 130 in the server 102. The update corrections 130, in some embodiments, may be delivered to the enterprise system 106 by the update tool 104 in order to automatically update and/or upgrade the enterprise application 140. Further, in some aspects, the update corrections 130 may make or correct, among other errors and/or issues with the enterprise application 140, product errors, product modifications, product upgrades, consulting notes, customizing notes, program corrections, code corrections, methods for table/field additions, customization changes, and otherwise. In short, the update corrections 130 may be applied to the code, data, objects, and other portions of the enterprise application 140.

The productive system 110 of the enterprise system 106, as illustrated, includes one or more internal clients 114. Internal client 114 may be any computing device operable to connect to or communicate with the productive system 110 (or other system within the enterprise system 106 or computer or system external to the enterprise system 106) using a wireline or wireless connection. For example, internal clients 114 may be a part of the business enterprise that owns, controls, and/or operates the enterprise system 106 that operates and/or executes the enterprise application 140 stored on or associated with the productive system 110. Further, while illustrated internal to the enterprise system 106, one or more internal clients 114 may be located external to the enterprise system 106. For example, distributed computing system 100, as illustrated, includes one or more external clients 135 communicably coupled to one or more of the server 102 and/or enterprise system 106 through network 112. External clients 135, in some aspects, may be clients not associated with, owned, or controlled by the business enterprise that controls, owns, and/or operates the enterprise system 106. Alternatively, external clients 135 may be similar to the internal clients 114 illustrated as internal to the enterprise system 106. In any event, there may also be one or more additional clients 135 (or 114) external to the illustrated portion of distributed computing system 100 that are capable of interacting with the distributed computing system 100 via the network 112. Further, the terms "client" and "user" may be used interchangeably as appropriate without departing from the scope of this disclosure. Moreover, while each internal client 114 and/or external client 135 is described in terms of being used by a single user, this disclosure contemplates that many users may use one computer, or that one user may use multiple computers.

As used in this disclosure, each of the development system 108, the productive system 110, and the clients 114 and 135 are intended to encompass a personal computer, touch screen terminal, workstation, server, network computer, kiosk, wireless data port, smart phone, personal data assistant (PDA), one or more processors within these or other devices, or any other suitable processing device. For example, each of the development system 108 and the productive system 110 may comprise a computer that includes an input device, such as a keypad, touch screen, mouse, or other device that can accept user information, and an output device that conveys information associated with the operation of the server 102 (and hosted application 122) or the enterprise system 106 itself, including digital data, visual information, or the enterprise application 140. Both the input and output device may include fixed or removable storage media such as a magnetic storage media, CD-ROM, or other suitable media to both receive input from and provide output to users of enterprise system 106 through the display, namely, the GUIs 105.

As illustrated, the enterprise system 106 also includes a transport service 116 communicably coupling the development system 108, the productive system 110 (as well as other systems not shown) with sets of repositories, including a source repository 124, a shadow repository 126, and a target repository 128. More specifically, as illustrated, each of the development system 108, the productive system 110 may be communicably coupled to a unique set of repositories including a source repository 124, a shadow repository 126, and a target repository 128.

At a high level, the transport service 116 may be any communication mechanism to facilitate data transfer between the illustrated components of the enterprise system 106. For example, the transport service 116 may be all or a portion of an enterprise or secured network, while in another instance a connection to the Internet. In some instances, a portion of the transport service 116 may be a virtual private network (VPN) and can comprise either a wireline or wireless link. The transport service 116 may communicate, for example, Internet Protocol (IP) packets, Frame Relay frames, Asynchronous Transfer Mode (ATM) cells, voice, video, data, and other suitable information, such as, for example, the update corrections 130, all or a portion of an updated or upgraded version of the enterprise application 140, or other application. The transport service 116 may also include one or more local area networks (LANs), radio access networks (RANs), metropolitan area networks (MANs), wide area networks (WANs), all or a portion of the Internet, and/or any other communication system or systems at one or more locations.

A source repository 124 within a unique set of repositories may be communicably coupled to a particular one of the development system 108 or the productive system 110 through the transport service 116 or by other techniques. The source repository 124, as illustrated, includes or stores source content 132. In some aspects, the source content 132 may be a current version of a software system, such as, for example, the enterprise application 140 stored on and/or executed on the development system 108 and the productive system 110.

A shadow repository 126 within a unique set of repositories may also be communicably coupled to a particular one of the development system 108 or the productive system 110 through the transport service 116 or by other techniques. The shadow repository 126, as illustrated, includes or stores shadow content 134. In some aspects, the shadow content 134 may be an update or upgrade to the current version of a software system located on the enterprise system 106, such as, for example, the enterprise application 140. For example, in some embodiments, such as when the shadow content 134 is an upgrade to the enterprise application 140, the shadow repository 126 may be a fixed repository delivered to the enterprise system 106, e.g., by DVD or other media. In some embodiments, such as when the shadow content 134 is an update to the enterprise application 140, the shadow repository 126 may be a clone of the source repository 124.

A target repository 128 within a unique set of repositories may also be communicably coupled to a particular one of the development system 108 and or the productive system 110 (and other systems of the enterprise system 106) through the transport service 116 or by other techniques. The target repository 128, as illustrated, includes or stores target content 136. In some aspects, the target content 136 may a result of adding content (e.g., delta packages or other content) to the shadow content 134 in the shadow repository 126.

In any event, one or more of each the illustrated repositories 124, 126, and 128 may be any form or structure of data storage. For example, the repositories illustrated in FIG. 1 may be hardware storage locations and structure, such as servers, fixed or removable storage media such as a magnetic storage media, CD-ROM, or other suitable storage location.

While FIG. 1 is described as containing or being associated with a plurality of elements, not all elements illustrated within distributed computing system 100 of FIG. 1 may be utilized in each alternative implementation of the present disclosure. For example, although FIG. 1 depicts a server-client environment implementing a hosted application at server 102 that can be accessed by the enterprise system 106, in some implementations, server 102 executes a local application that features an application UI accessible to a user directly utilizing a GUI 105 at one or more of the external clients 135, the internal clients 114, or the development system 108 or productive system 110. Further, although FIG. 1 depicts a server 102 external to network 112, servers may be included within the network 112 as part of a cloud network solution, for example. Additionally, one or more of the elements described herein may be located external to distributed computing system 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
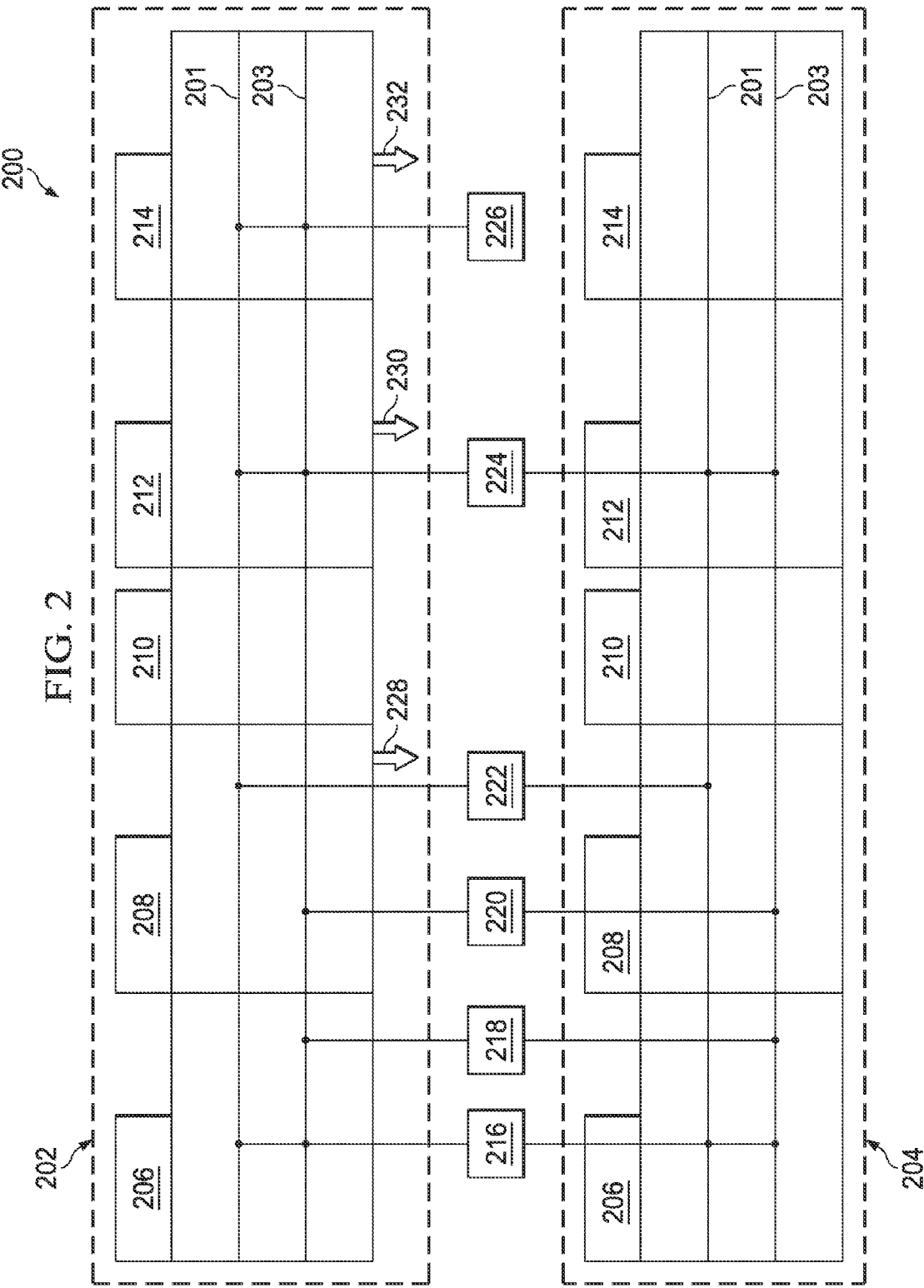
FIG. 2 illustrates a process diagram of an example process for updating and/or upgrading an enterprise software application by an update tool according to the present disclosure.

FIG. 2 illustrates a process diagram of an example process 200 for updating and/or upgrading an enterprise software application by an update tool. For example, process 200 may be implemented by the update tool 104 on the distributed computing system 100 including the development system 108 and the productive system 110 of the enterprise environment 106. Further, the process 200 may represent an upgrade process and an update process implementable by an update tool, such as the update tool 104.

As illustrated, process 200 includes a development subprocess 202 executed (or executable) on a development system (e.g., development system 108) of an enterprise environment and a productive sub-process 204 executed (or executable) on a productive system (e.g., productive system 110) of the enterprise environment. In each of the development sub-process 202 and the productive sub-process 204, an update case 201 and an upgrade 203 are illustrated at various stages (206, 208, 210, 212, and 214) within each sub-process 202 and 204. One or more actions (216, 218, 220, 222, 224, and 226) may be performed by the update tool during each stage of the development sub-process 202 and the productive sub-process 204.

Beginning with a preparation stage 206, the update tool may perform an action 216 in the development sub-process 202 and the productive sub-process 204. In the development sub-process 202, the update tool may request a development user at the action 216. For example, the update tool may ask an administrator of the development and/or productive system for the credentials of the development user if, for example, certain content (e.g., corrections, notes or otherwise) are to be applied to a shadow repository in the enterprise environment. With respect to the productive sub-process 204, the update tool may execute a "get request" at the action 216. As illustrated, action 216 may be taken by the update tool in both the update case 201 and the upgrade case 203.

Continuing in the preparation stage 206, the update tool may perform an action 218 in the development sub-process 202 and the productive sub-process 204. As illustrated, however, the action 218 may only be taken by the update tool in the upgrade case 203 and includes building one or more queues by the update tool. For example, a list of required content to be upgraded may be built, for instance, into an implementation queue of content and a shadow queue of content.

At a shadow run stage 208, the update tool may perform an action 220 in the development sub-process 202 and the productive sub-process 204. As with the action 218, however, action 220 may only be taken by the update tool in the upgrade case 203. Action 220 includes implementing the shadow queue in the development sub-process 202 and checking the shadow queue in the productive sub-process 204.

Continuing in the shadow run stage 208, the update tool may perform an action 222 in the development sub-process 202 and the productive sub-process 204. In the illustrated embodiment, action 222 may only be taken by the update tool in the update case 201. Action 222 includes implementing a late update queue in the development sub-process 202 and the productive sub-process 204. The late update queue may include updates (e.g., notes, objects, and other update content) that may be made to the enterprise application at a late stage of the update case 201, such as after other updates (e.g., in the implementation and shadow queues) are implemented. Further, during the shadow run stage 208, an export process 228 may occur, in which the implementation, shadow, and late update queues may be exported from a development system in the enterprise environment to a productive system in the enterprise environment.

Next, at an import stage 210, the implementation, shadow, and late update queues may be imported from the development system in the enterprise environment to the productive system in the enterprise environment.

Next, at a post-importation stage 212, the update tool may perform an action 224 in the development sub-process 202 and the productive sub-process 204. In the update case 201, the update tool may implement the late update queue, while in the upgrade case 203, the update tool may check the late update queue. For example, in the update case 201, the late update queue may be implemented in, for example, a development system in the enterprise environment. Further, during the post-importation stage 212, an export process 230 may occur in which the late update queue may be exported from the development system in the enterprise environment to the productive system in the enterprise environment.

Next, at a completion stage 214, the update tool may perform an action 226 in the development sub-process 202. In some embodiments, the action 226 performed by the update tool may be identical or substantially identical in both the update case 201 and the upgrade case 203, but as illustrated, action 226 may be confined to the development sub-process 202. Action 226 includes determining and/or presenting changes made to the enterprise action by the implementation, shadow, and/or late upgrade queues, such as changes made to data and/or objects customized by a user or administrator of the enterprise application. For instance, in some instances, the administrator of the enterprise application (e.g., an IT administrator of the business enterprise) may customize data and objects, such as repository objects or other business objects. A business object, as used herein, is a capsule with an internal hierarchical structure, behavior offered by its operations, and integrity constraints. Business objects are generally semantically disjointed, i.e., the same business information is represented once.

Further, during the completion stage 214, an export process 232 may occur in order to, for example, transport customized changes overwritten by the implementation, shadow, and/or late upgrade queues from the development sub-process 202 to the productive sub-process 204. For instance, customizations by the administrator of the enterprise application may be reapplied (manually or automatically) to the productive system of the enterprise system.

Figure 3B:
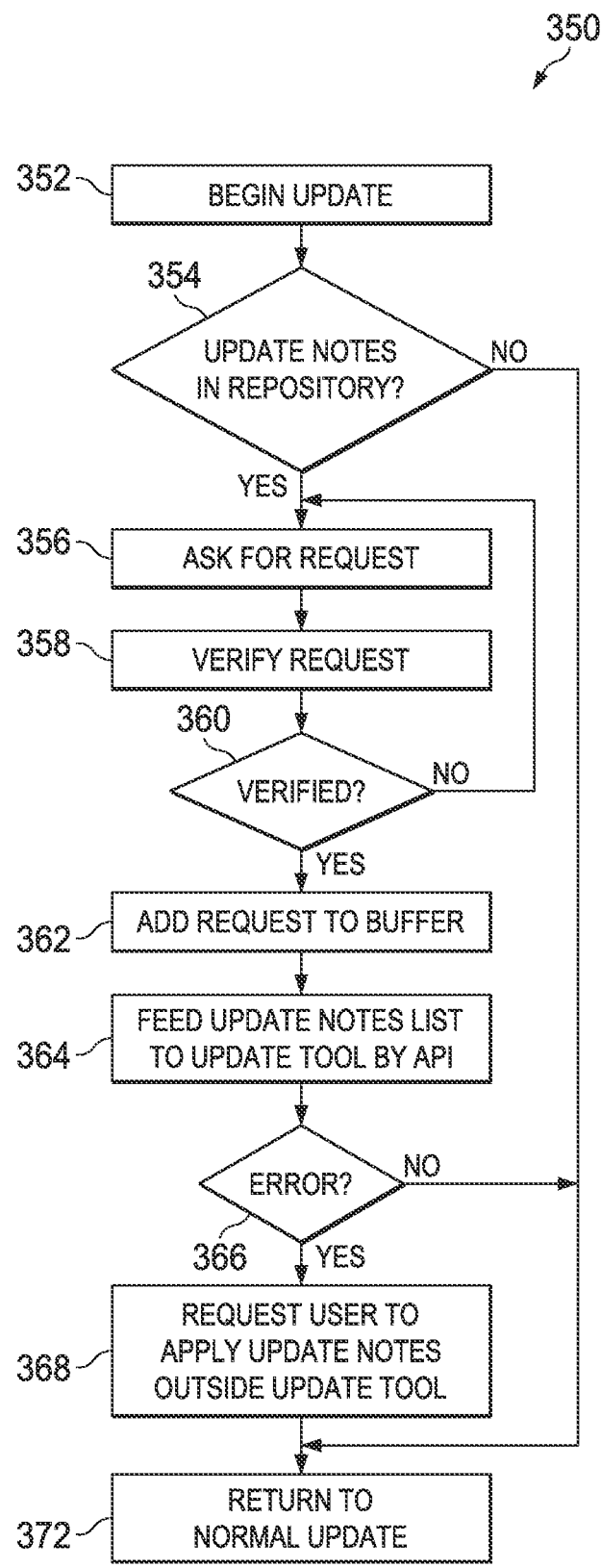

FIGS. 3A-3B illustrate example methods 300 and 350 for updating and/or upgrading an enterprise software application by an update tool. For example, one or both of methods 300 and 350 may be implemented by update tool 104 illustrated in FIG. 1. Alternatively, methods 300 and/or 350 may be implemented by another update tool in accordance with this disclosure.

Turning to FIG. 3A and method 300 in particular, this method may be implemented, for example, in an update process, such as when an enterprise application needs to be updated (e.g., with bug fixes, notes, and otherwise). Method 300 may begin at step 302, when an update upgrade process begins. At step 304, a determination is made whether there are update corrections (i.e., content to update a software application) in a repository. If there are no update corrections in a repository, then method 300 returns to a normal update process (e.g., to fix bugs and otherwise) in step 334. If there are update corrections in a repository at step 304, then the update tool asks for a user at step 306. For example, the update tool may request a development user if, for example, certain content (e.g., notes or otherwise) are to be applied to an enterprise application. At step 308, the update tool may verify the user. If the user is not verified at step 310, then the update tool may request an alternate user at step 306.

If, however, the user is verified at step 310, then the update corrections are fed to the update tool at step 312. In some aspects, for example, this may be done as a control file. In step 314, the update tool may determine if the update corrections, for example in the control file, are already present, and complete. If update corrections are missing or are incomplete, then the update tool requests a notes download at step 316. The missing and/or incomplete notes are uploaded at step 318 and the process returns to step 312 where the update corrections (now including the missing and/or incomplete notes) are fed to the update tool.

If the update corrections, for example in the control file, are not missing or incomplete at step 314, then the update tool generates a queue, such as a notes implementation queue, at step 320. The implementation queue includes the complete update corrections. At step 322, the update tool checks the implementation queue to determine if it is empty. If the implementation queue is empty, then the method 300 returns to a normal update process (e.g., to fix bugs and otherwise) in step 334.

If the implementation queue is not empty at step 322, then the implementation queue is fed to the update tool at step 324. For instance, step 324 may include feeding the implementation queue (including the update corrections) to an API (i.e., application programming interface) of the update tool. After the implementation queue is fed to the update tool at step 324, the update tool checks for any errors at step 326. If errors have occurred in feeding the implementation queue to the update tool, then a request is presented to the user to try again at step 328. If the user responds affirmatively to the request at step 328, then another attempt is made to feed the implementation queue (including the update corrections) to the update tool (e.g., via the API). If the user responds negatively to the request at step 328, then the user is requested to apply the update corrections (e.g., to the enterprise application) outside of the update tool at step 330. The method 300 then returns to step 332.

If no errors have occurred in feeding the implementation queue to the update tool, or the user has confirmed the reached state as correct, then the update tool creates a request that is exported at step 332. For instance, the request may include all update content including the update corrections (e.g., objects, corrections, and otherwise). The request may then be imported to a system of an enterprise environment, different than the development system, where it may be applied to update a software application, such as the enterprise application. Method 300 may then return to a normal update process in step 334.

Turning to FIG. 3B and method 350 in particular, this method may be implemented, for example, in an upgrade process to a productive system, such as when an enterprise application is upgraded to a new version. Method 350 may begin at step 352, when an update upgrade process begins. At step 354, a determination is made with there are update corrections (i.e., content within an upgrade of a software application) in a repository. If there are no update corrections in a repository, then method 350 returns to a normal upgrade process (e.g., to upgrade the enterprise application to a new version) in step 372. If there are update corrections in a repository at step 354, then the update tool asks for a request (e.g., an update corrections request) at step 356. At step 358, the update tool may verify the request. For example, a request may be verified if it fulfills certain requirements, such as, for example, it contains the upgrade content (e.g., changed objects, notes, and other content). If the request is not verified at step 360, then the update tool may ask for an alternate request at step 356 and continue from this step.

If, however, the request is verified at step 360, then the request is added to a buffer. For example, the update corrections request may be added to a main buffer for a source repository and/or a shadow buffer of a shadow repository of an enterprise system. In some aspects, this may be accomplished through a transport service, such as the transport service 116 illustrated in FIG. 1. Next, the update corrections in a list are fed to the update tool via an API at step 364. After the update corrections list is fed to the update tool via the API at step 364, the update tool checks for any errors at step 366. If no errors have occurred in feeding the notes list to the update tool, then the method 350 returns to a normal upgrade process (e.g., to upgrade the enterprise application to a new version) in step 372.

If errors have occurred in feeding the notes list to the update tool, then a request is presented to the user to apply the update corrections outside of the update tool at step 368 (e.g., through a conventional notes upgrade process). The method 350 then returns to a normal update process in step 334.

A number of embodiments have been described. Nevertheless, it will be understood that various modifications may be made. For instance, the illustrated steps of methods 300 and 350 may be performed in different orders than those shown in FIGS. 3A-3B. Further, one or more of the illustrated steps of methods 300 and 350 may not be performed. One or more additional steps not illustrated herein may be implemented in some embodiments of methods 300 and 350. In addition, other methods related to the form transformation module according to the present disclosure may be implemented. Accordingly, other embodiments are within the scope of the following claims.

What is claimed is:

1. A computer-implemented method for modifying software code, the method comprising the following steps performed by one or more processors:
processing a command to modify a first module of software code stored on a productive system in a distributed computing environment, the software code comprising a first plurality of data objects and a first plurality of notes;
verifying the first plurality of notes to retrieve one of a missing note and an incomplete note;
based on the verification, generating at least one implementation queue comprising a second plurality of notes to modify a second module of software code stored on a source repository of a development system in the distributed computing environment with the second plurality of notes, the second module of software code comprising a version of the first module of software code;
generating at least one shadow queue comprising a third plurality of notes;
modifying a third module of software code stored on the shadow repository with the third plurality of notes, the third module of software code comprising a version of the second module of software code and the shadow repository being a clone of the source repository;
requesting a transfer of the third module of software code from the shadow repository in the distributed computing environment to the productive system; and
based on a confirmation of the request, transferring the third module of software code to the productive system to modify the first module of software code such that the first plurality of notes are modified by the third plurality of notes and the data objects are customized based on the third plurality of notes.

2. The method of claim 1, further comprising:
transmitting a request for a development user to an administrator of the development system;
receiving the requested development user; and
verifying the received development user.

3. The method of claim 1, further comprising:
generating a control file comprising the second plurality of notes;
verifying the control file to determine whether the second plurality of notes is incomplete; and delivering the verified control file to the development system to generate the at least one queue.

4. The method of claim 1, further comprising:
verifying the at least one queue comprising the second plurality of notes;
based on the verification, creating an update request comprising the at least one queue; and
exporting the update request from the development system.

5. The method of claim 1, further comprising:
asking for an update request;
receiving the update request; and
verifying the update request.

6. The method of claim 1, wherein generating at least one queue comprising the second plurality of notes comprising exposing an API.

7. The method of claim 1, further comprising:
generating at least one update queue comprising a fourth plurality of notes; and
modifying a fourth module of software code stored on a target repository in the distributed computing environment with the fourth plurality of notes, the fourth module of software code comprising a version of the third module of software code.

8. The method of claim 1, wherein each of the first plurality of notes, the second plurality of notes and the third plurality of notes comprise one or more of a program correction, an addition method, a correction method, a deletion method, or a customized change.

9. A computer program product for modifying software code, the computer program product comprising computer readable instructions embodied on tangible, non-transitory media that are executable to perform operations comprising:
processing a command to modify a first module of software code stored on a productive system in a distributed computing environment, the software code comprising a first plurality of data objects and a first plurality of notes;
verifying the first plurality of notes to retrieve one of a missing and an incomplete note;
based on the verification, generating at least one implementation queue comprising a second plurality of notes to modify a second module of software code stored on a source repository of a development system in the distributed computing environment with the second plurality of notes, the second module of software code comprising a version of the first module of software code;
generating at least one shadow queue comprising a third plurality of notes;
modifying a third module of software code stored on the shadow repository with the third plurality of notes, the third module of software code comprising a version of the second module of software code and the shadow repository being a clone of the source repository;
requesting a transfer of the third module of software code from the shadow repository in the distributed computing environment to the productive system; and
based on a confirmation of the request, transferring the third module of software code to the productive system to modify the first module of software code such that the first plurality of notes are modified by the third plurality of notes and the data objects are customized based on the third plurality of notes.

10. The computer program product of claim 9, wherein the operations further comprise:
transmitting a request for a development user to an administrator of the development system;
receiving the requested development user; and
verifying the received development user.

11. The computer program product of claim 9, wherein the operations further comprise:
generating a control file comprising the second plurality of notes;
verifying the control file to determine whether the second plurality of notes is incomplete; and
delivering the verified control file to the development system to generate the at least one queue.

12. The computer program product of claim 9, wherein the operations further comprise:
verifying the at least one queue comprising the second plurality of notes;
based on the verification, creating an update request comprising the at least one queue; and
exporting the update request to the development system.

13. The computer program product of claim 9, wherein the operations further comprise:
asking for an update request;
receiving the update request; and
verifying the update request.

14. The computer program product of claim 9, wherein modifying a second module of software code stored on a development system in the distributed computing environment with the second plurality of notes comprises modifying the second module of software code stored on a source repository of the development system.

15. The computer program product of claim 9, wherein the operations further comprise:
generating at least one update queue comprising a fourth plurality of notes; and
modifying a fourth module of software code stored on a target repository in the distributed computing environment with the fourth plurality of notes, the fourth module of software code comprising a version of the third module of software code.

16. The computer program product of claim 9, wherein each of the first plurality of notes, the second plurality of notes and the third plurality of notes comprise one or more of a program correction, an addition method, a correction method, a deletion method, or a customized change.

17. A system for modifying software code, comprising:
at least one memory storing an update tool; and
one or more processors operable to execute the update tool, the tool operable when executed to:
process a command to modify a first module of software code stored on a production productive system in a distributed computing environment, the software code comprising a first plurality of data objects and a first plurality of notes;
verify the first plurality of notes to retrieve one of a missing and an incomplete note;
based on the verification, generate at least one implementation queue comprising a second plurality of notes to modify a second module of software code stored on a source repository of a development system in the distributed computing environment with the second plurality of notes, the second module of software code comprising a version of the first module of software code;
generate at least one shadow queue comprising a third plurality of notes;
modify a third module of software code stored on the shadow repository with the third plurality of notes, the third module of software code comprising a version of the second module of software code and the shadow repository being a clone of the source repository;

request a transfer of the third module of software code from the shadow repository in the distributed computing environment to the productive system; and based on a confirmation of the request, transfer the third module of software code to the production productive system to modify the first module of software code such that the first plurality of notes are modified by the third plurality of notes and the data objects are customized based on the third plurality of notes.

18. The system of claim 17, wherein the tool is further operable when executed to:

transmit a request for a development user to an administrator of the development system;

receive the requested development user; and verify the received development user.

19. The system of claim 17, wherein the tool is further operable when executed to:

generate a control file comprising the second plurality of notes;

verify the control file to determine whether the second plurality of notes is incomplete; and deliver the verified control file to the development system to generate the at least one queue.

20. The system of claim 17, wherein the tool is further operable when executed to:

verify the at least one queue comprising the second plurality of notes;

based on the verification, create an update request comprising the at least one queue; and export the update request to the development system.

21. The system of claim 17, wherein the tool is further operable when executed to:

ask for an update request;

receive the update request; and verify the update request.

22. The system of claim 17, wherein generating at least one queue comprising the second plurality of notes comprising exposing an API.

23. The system of claim 17, wherein the tool is further operable when executed to:

generate at least one update queue comprising a fourth plurality of notes; and modify a fourth module of software code stored on a target repository in the distributed computing environment with the fourth plurality of notes, the fourth module of software code comprising a version of the third module of software code.

24. The system of claim 17, wherein each of the first plurality of notes, the second plurality of notes and the third plurality of notes comprise one or more of a program correction, an addition method, a correction method, a deletion method, or a customized change.

* * * * *